UNITED STATES PATENT OFFICE.

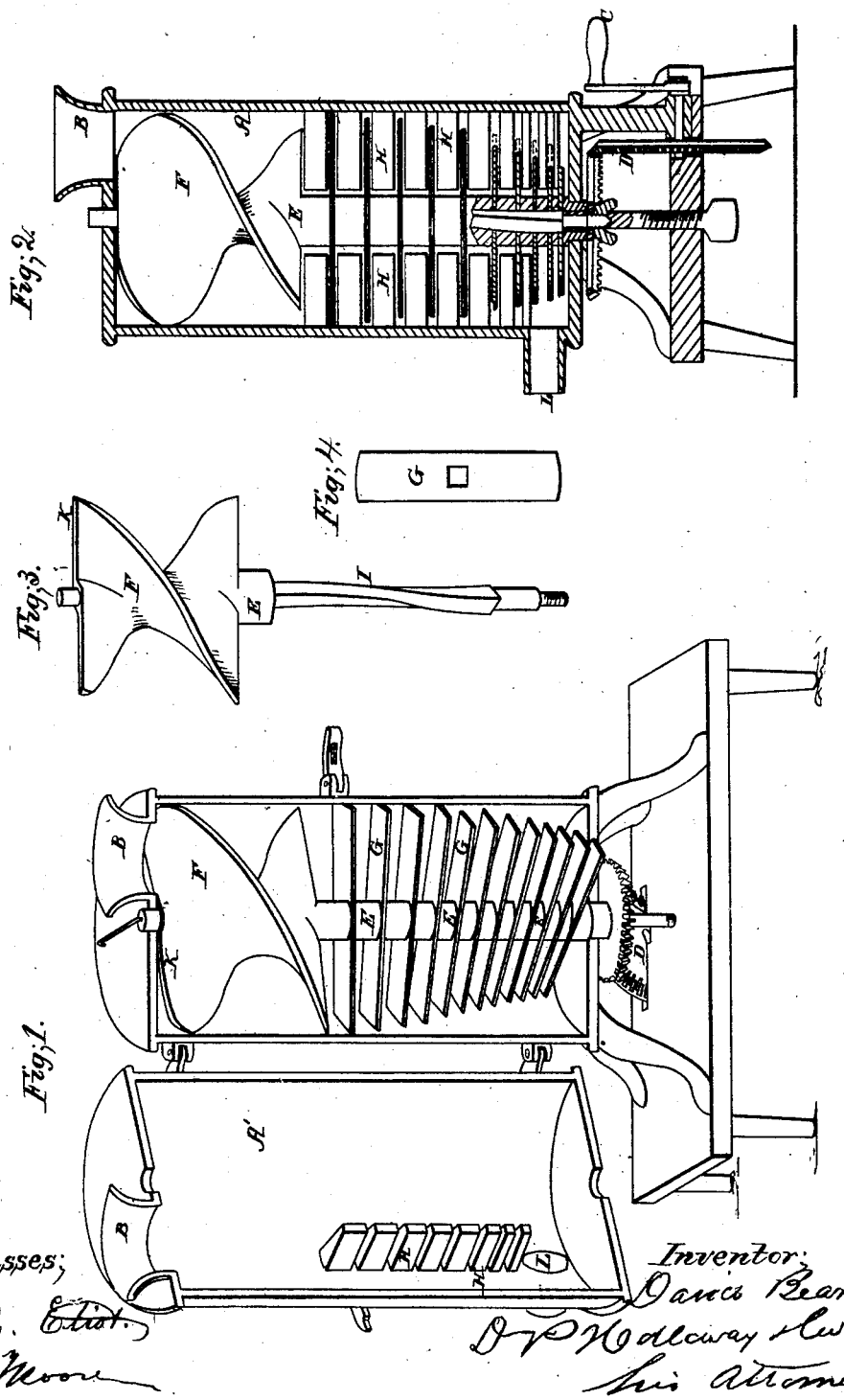

DAVID BEARLY, OF NEW CASTLE, INDIANA, ASSIGNOR TO JAMES J. HAMILTON, OF SAME PLACE.

MEAT-CUTTER.

Specification forming part of Letters Patent No. 50,984, dated November 14, 1865.

*To all whom it may concern:*

Be it known that I, DAVID BEARLY, of New Castle, in the county of Henry and State of Indiana, have invented a new and useful Improvement on Machines for Cutting Meat for Sausage; and I do hereby declare that the following is a full, clear, and exact description of the same, reference being had to the annexed drawings, making a part of this specification, in which—

Figure 1 is a perspective view, the case being open. Fig. 2 is a section of the machine longitudinally. Fig. 3 is a view showing the construction of the shaft upon which the knives are fastened, with the helical flange attached. Fig. 4 is a plan showing a cutting-knife detached.

The nature of my invention consists in arranging a meat-cutter upon a vertical shaft, which is made to turn like a screw in continuation of the twist of the helical flange, the knives being arranged successively nearer together, so that the operation of mincing the meat is perfected, and at the same time the chopped meat is by the operation of the screw-formed cutters forced through the discharge-pipe, the machine thus performing the double function of a sausage-cutter and stuffer.

To enable others skilled in the art to make and use my invention, I will proceed to describe its construction and operation.

In referring to the drawings, the same letters are employed in the different plans in connection with identical parts.

A is a metallic case inclosing the cutting apparatus, divided into two parts, A and A', with latch and hinges to afford easy access to the knives.

B is a funnel-shaped opening, through which the meat may be introduced in small pieces or strips. The lower edges of this mouth are made square, so as to shear the meat in combination with the sharp edges K of the screw F.

C is the crank, by which motion is communicated by the bevel-wheels D to the shaft I. This shaft is made four-sided, the faces twisted like a screw, so as to continue the curvature of the propeller-shaped screw F, which is placed upon the extremity of the shaft I. The upper edges of this screw F are made sharp, so as, in combination with the sharply-square edges of the funnel-shaped aperture B, to cut or shear the meat into small pieces, which are forced down by the action of the screw upon the knives G. The screw F is made of steel, or if made of cast-iron it has a steel knife attached to its upper extremity, by which the meat is cut as it enters at B. These knives are thin plates of steel sharpened upon both edges, with a square hole, as shown in Fig. 4, of the size of the shaft I. These knives are placed spirally upon the shaft separated by the washers E, which decrease in thickness from the top to the bottom, so that the meat as it passes down through the machine is constantly minced finer by the successive knives. The knives are sharpened on both edges, so that when one edge is dulled from use the knife may be reversed. When the meat has passed through the machine, it is discharged through the aperture L, which may be in the side, as represented, or in the bottom.

H are steel projections from the side of the case, between which the knives pass. These diminish in vertical diameter with the washers separating the knives.

The mode of operating the machine has been indicated in the foregoing description.

The advantages claimed over other machines for a similar purpose consist in its vertical arrangement, admitting of more convenient feeding, the meat need not be cut into small pieces, but may be fed in long strips, the first operation of cutting into suitable pieces being performed by the sharp edge K of the screw F. By reducing the distance between the knives G the operation of mincing the meat is more perfectly accomplished, and by the screw-form arrangement of the flange F and knives G upon the shaft I the minced meat is forced from the discharge-pipe L, and in manufacturing sausage the skins being placed over this pipe will be filled and the meat minced by a single operation.

Having fully described my invention, what I claim as my invention, and seek to secure by Letters Patent, is—

1. The combination of the case A A' and vertical shaft I, substantially as described, and for the purposes specified.

2. The combination of the funnel-shaped mouth B and propeller-shaped screw F, with its sharp cutting-edges K, substantially as described, and for the purpose indicated.

3. The combination of the propeller-shaped screw F, the vertical screw-shaped shaft I, the washers E, knives G, and projections H, substantially as described, and for the purposes indicated.

In testimony whereof I have signed my name to this specification in the presence of two subscribing witnesses.

DAVID BEARLY.

Witnesses:
JOEL REED,
J. B. MARTINDALE.